Sept. 26, 1950                J. TOURRES                2,523,737
METHOD AND A MACHINE FOR THE PRODUCTION OF DRINKING
GLASSES AND SIMILAR GLASS ARTICLES Inventor
JACQUES TOURRES
By Haseltine, Lake & Co.
Attorneys Sept. 26, 1950 J. TOURRES 2,523,737
METHOD AND A MACHINE FOR THE PRODUCTION OF DRINKING
GLASSES AND SIMILAR GLASS ARTICLES
Filed Dec. 22, 1945 7 Sheets-Sheet 4
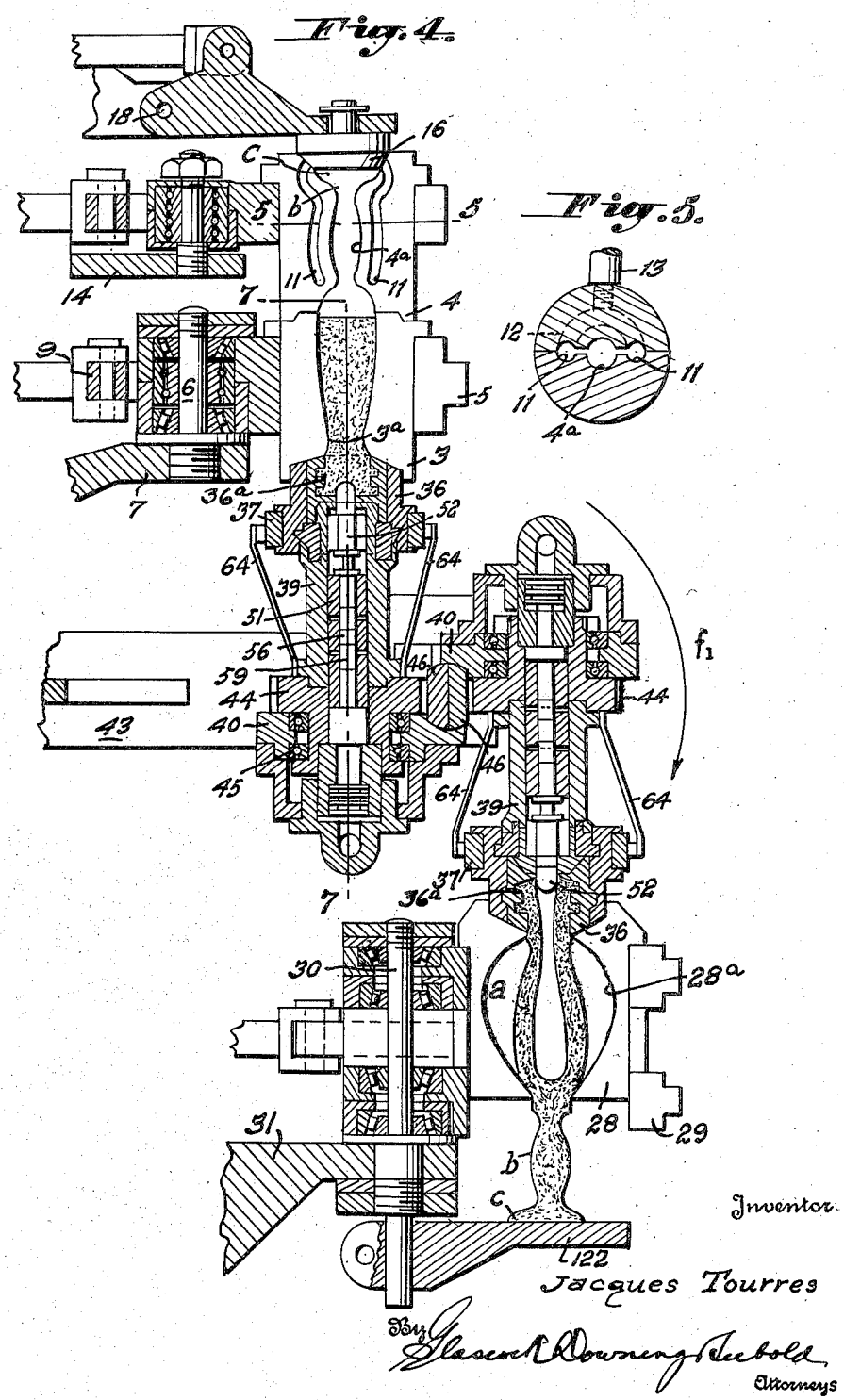
Inventor
Jacques Tourres
By
Attorneys Sept. 26, 1950　　　　　　　J. TOURRES　　　　　　2,523,737
METHOD AND A MACHINE FOR THE PRODUCTION OF DRINKING
GLASSES AND SIMILAR GLASS ARTICLES
Filed Dec. 22, 1945　　　　　　　　　　　　　7 Sheets-Sheet 5

Fig. 6

Inventor
JACQUES TOURRES
By
Attorneys

Sept. 26, 1950 J. TOURRES 2,523,737
METHOD AND A MACHINE FOR THE PRODUCTION OF DRINKING
GLASSES AND SIMILAR GLASS ARTICLES
Filed Dec. 22, 1945 7 Sheets-Sheet 6
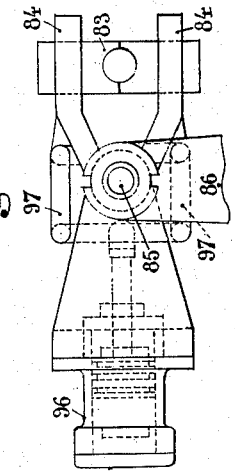
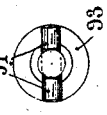
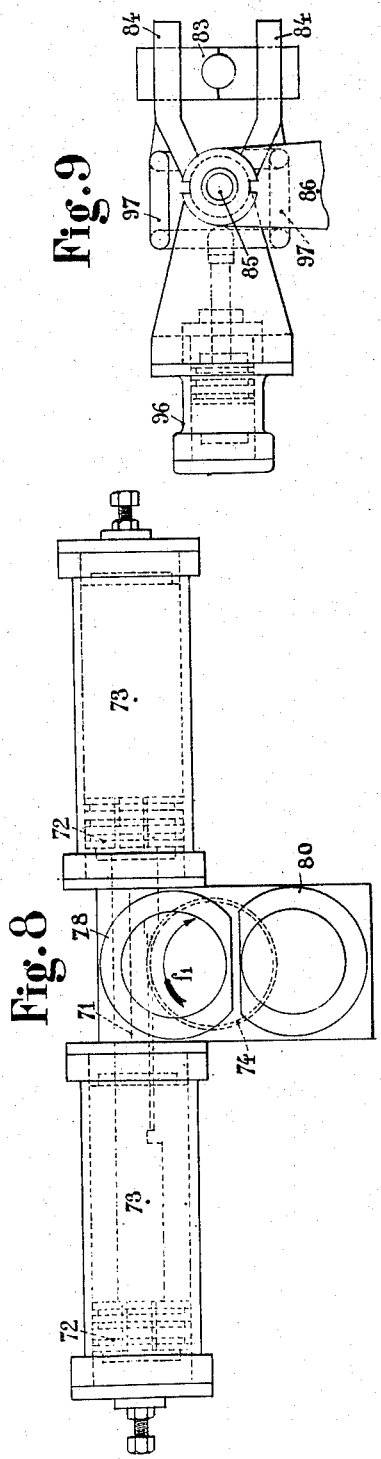
Inventor
JACQUES TOURRES
By Glascock Downing Seebold
Attorneys

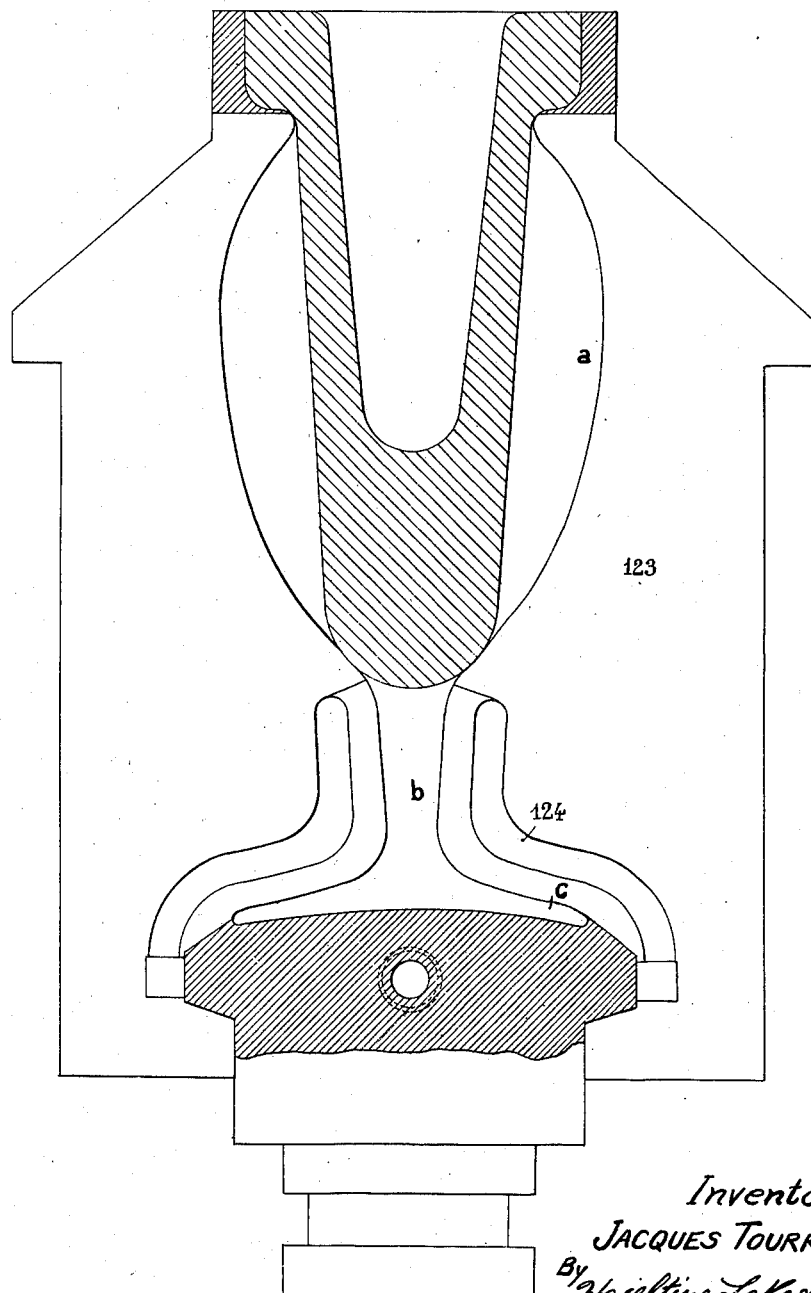

Patented Sept. 26, 1950

2,523,737

UNITED STATES PATENT OFFICE 2,523,737

METHOD AND A MACHINE FOR THE PRODUCTION OF DRINKING GLASSES AND SIMILAR GLASS ARTICLES

Jacques Tourres, Le Havre, France

Application December 22, 1945, Serial No. 636,802
In France May 19, 1944

Section 1, Public Law 690, August 8, 1946
Patent expires May 19, 1964

4 Claims. (Cl. 49—9)

Up to the present time, the production of drinking glasses comprising a cup, a leg or stem having a definite height and a foot involved the co-operation of at least two men, one who blows the cup and the other who turns both the leg and the foot at one time, whereafter said leg is to be fused to the bottom of the cup; it is even not uncommon that the leg and the foot must be shaped separately and then fused, so that the co-operation of three men is necessary.

According to this invention, the three parts of a glass with a foot are shaped at one time and as one piece, that is, seamless, as a result of the combined use of a blowing action exerted within the gather for the production of the cup in the conventional manner and of a suction exerted from the outside on said gather with a view to forcing the glass into the comparatively narrow cavities in the mold for the leg and foot.

Besides, this method is also applicable to the manufacture of any other glass article that comprises hollow parts which must be blown and parts whose narrow sections make it difficult for the glass to flow into the corresponding mold portions.

This invention extends also to a machine designed for a wholly automatic performance of this method.

The embodiment of the said machine which will now be described by way of example is also designed in such manner that it will allow the gather being rotated within the molds for the purpose of conferring a smooth and bright surface to the glass articles.

In the illustrating drawing appended hereto,

Figure 4 is a partial vertical sectional view along section line I—I of Figure 2, but on a larger scale than that of Figure 1.

Figure 5 is a cross sectional view of the foot mold along the section line 5—5 of Figure 4.

Figure 6 is a vertical sectional view through the axis of rotation of the ring molds along the section line VI—VI of Figure 2.

Figure 8 is a partial elevational view showing the mechanism serving to tilt the gather upside down from the roughing mold into the finishing mold.

Figure 9 is a plan view of the control mechanism for the tongs serving to take away the finished glasses.

Figure 10 is a horizontal sectional view taken on line 10—10 in Fig. 1.

Figure 11 is a vertical sectional view of a finishing mold designed for the manufacture of one of various forms of glasses or tumblers.

A stand 1 (Figs. 1 and 2) supports four identical units A, B, C, D and also distributing mechanisms E, F, G.

The parts of said units are supported by a pair of uprights 2 which are H-shaped in section and are secured on the stand.

Figure 1:
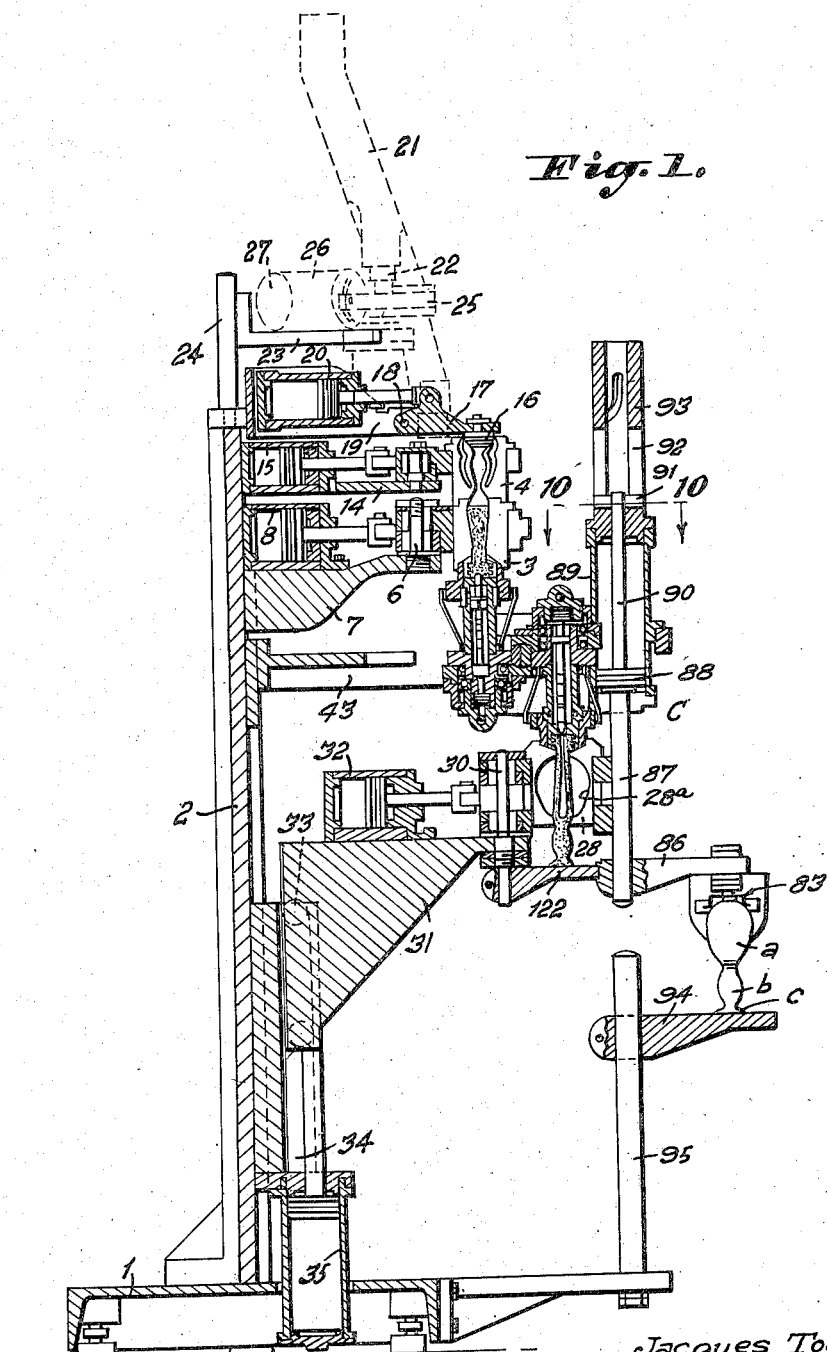
Figure 1 is a vertical sectional view taken on line I—I in Fig. 2 and showing one of the four identical units A, B, C, D comprising this machine.
Figure 2:
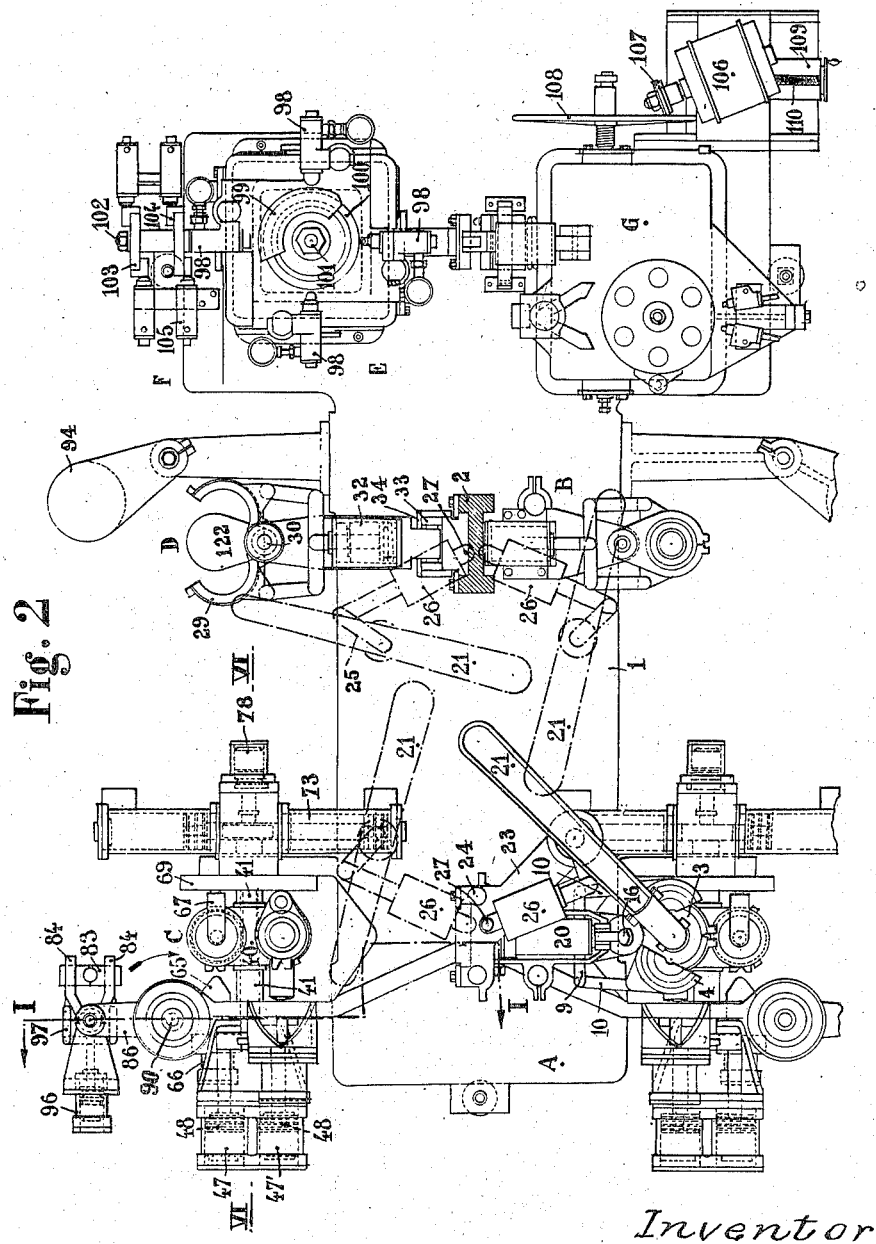
Figure 2 is a top plan view from which various members of units B, C, D have been omitted in order more clearly to show the remaining parts.

Arranged above each other in unit C (Figs. 1 and 4), which is shown as particularly designed for the manufacture of glasses with a comparatively long stem, are two roughing molds 3 and 4, of which the one 3 serves to produce the roughcast 3a of the cup and the other 4 serves to shape the leg b and the foot c in one piece with said roughcast. The mold 3, made in two halves, is carried by a pair of jaws 5 (Fig. 4) hinged at 6 on a horizontal support 7 secured to upright 2. The opening and closing of said mold halves are controlled by a compressed air cylinder 8 secured to the support 7 and the piston of which cylinder is connected with the jaws 5 by means of a cross bar 9 and a pair of links 10 (Fig. 2).

The novel feature of the mold 4 as compared with the known ones is that grooves 11 (Figs. 4 and 5) are provided at either side of the cavities 4a corresponding to the leg b and the foot c in the abutting faces of both mold halves; these grooves communicate through a channel 12 (Fig. 5), provided in the body of the mold, with a flexible or articulated pipe 13 connected with a vacuum pump (not shown) through a piping provided with a cock. Grooves 11 communicate with the inside of the mold through clearances provided between the inner edges of the mold halves, which clearances are sufficiently small to preclude any glass flowing thereinto.

Mold 4 is mounted like mold 3 on a horizontal support 14, and its opening and closing movements are also controlled by a compressed air cylinder 15.

The top of the mold can be liquid sealed by a plug 16 carried by an arm 17 hinged at 18 on a support 19 secured to the upright 2 and controlled by a compressed air cylinder 20 pivoted on said support.

When the plug is in its raised position and the mold halves 4 are swung apart the molten glass flowing from a feeder (not shown) can be poured into the mold 3 through a spout 21 rotatably mounted on a pin 22 whose support 23 is secured on rods 24 attached to the upper end of upright 2. Said spout is connected by an arm 25 to the piston rod of a compressed air cylinder 26 hinged at 27 on the support 23 so that it can either be positioned as shown at A (Fig. 2) with its upper end aligned below the feeder located above the centre of the machine and its lower end aligned above the roughing mold 4, or be swung away from said position as indicated by dash and dotted lines on units B, C and D.

The finishing mold 28 having cup-shaped recess 28a designed to blow the cup into its final shape is carried, like the former, by jaws 29 hinged at 30 on a support 31 and operated by a compressed air cylinder 32.

The bracket 31 which carries pin 30 and cylinder 32 is movable vertically and guided by means of rollers 33 in guideways 34 reciprocably mounted with respect to upright 2. Its movements up and down are effected by a compressed air cylinder 35 secured below the guideways 34.

The gathers are transferred from the roughing mold 4 to the finishing mold 28 by means of two bead molds 36 secured in jaws 37 whose fulcrum pins 38 (Fig. 6) are mounted on sleeves 39 carried by a support 40. The latter in turn is carried on a pair of hollow trunnions or sleeve bearings 41, 41a in ball bearings 42 mounted in a bracket 43 secured to upright 2 in such manner that said support can be rotated about an axis X—X (Fig. 6) normal to the vertical plane through the axes of the bead molds. The latter are arranged symmetrically with respect to axis X—X in such manner that they can be brought alternatively into register with the bottom of the roughing mold 4 and the top of the finishing mold 28 as shown in Figs. 1 and 4.

Figure 3:
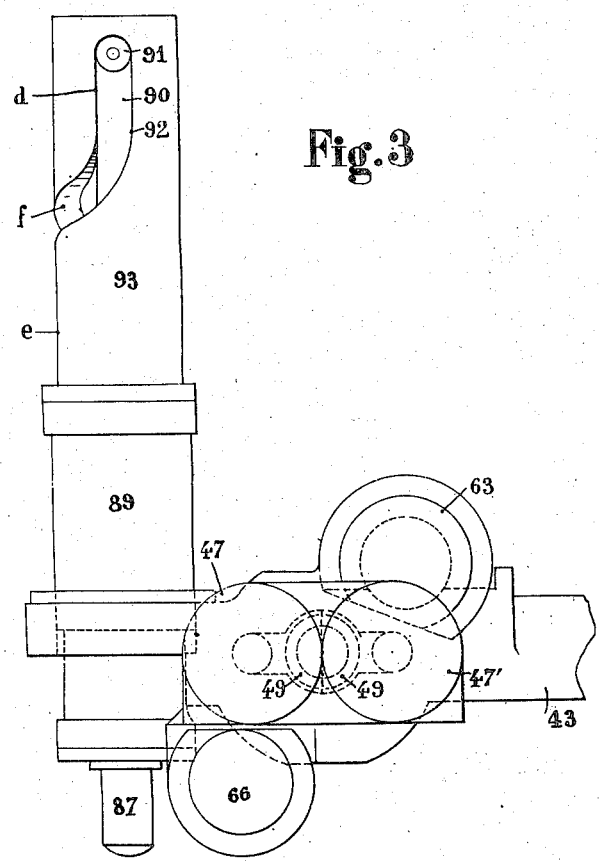
Figure 3 is a partial elevational view of unit B as seen from the opposite side in Fig. 1, this view being on a larger scale.

The sleeves 39 are secured on mutilated gears 44 adapted to rotate through the medium of ball bearings 45 on support 40 and which mesh with a pair of racks 46 guided to reciprocate in contact with each other in the direction of axis X—X and capable of swivelling as one unit with the support 40 and all the parts carried by the latter. Said racks are operated independently of each other by compressed air cylinders 47, 47' (Figs. 2, 3, 6) which are secured to the stationary bracket 43 and the pistons 48 of which actuate their connected racks, respectively, by means of a side fork 49 engaging a half-collar 50 rigid with the related rack. The alternating rotary motion thus imparted to gears 44, sleeves 39 and consequently bead molds 36 results in causing the gathers to revolve within the molds, with the result that their surfaces are made even and bright; the gathers are forced into this rotational movement by projections or recesses 36a provided in the inner wall of the bead molds.

Reciprocably arranged within each sleeve 39 and related bead mold 36 is a plunger 51 ending in a punch 52 designed to originate the cavity in the gather within the roughing mold 3 and which transmits a reciprocatory motion to said punch that is imparted to it by a rod 54 (Fig. 7) reciprocably mounted in a side guide 55 secured to sleeve 39. For this purpose said rod 54 is bent to form a pair of steps 56, 57 with a slope 58 therebetween, and either of which can be engaged between a pair of rollers 59 carried by the plunger 51. A spring 60 constantly urges the rod 54 towards the outside and tends to maintain the same in the position shown in Fig. 7, in which it bears against the collar 61 thereon forcing same against the end wall of the guide 55, and in which the step 56 holds the punch-carrying plunger 51 within the sleeve 39. However, a piston rod 62 reciprocably mounted in a compressed air cylinder 63 secured to bracket 43 is capable, when the sleeve 39 is in its raised position (Fig. 4) to push rod 54 inwardly and thus to bring the portion 57 into position between the rollers 59, which forces the plunger 51 to move upwardly so that the punch 52 may enter the bead mold and punch the gather.

Figure 7:
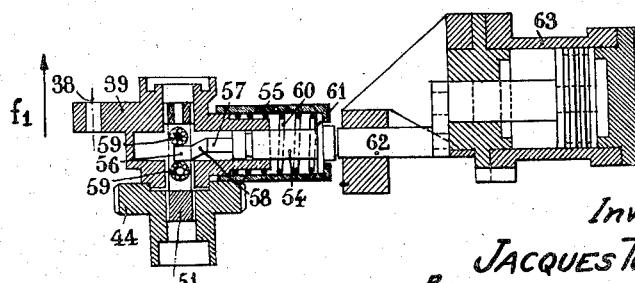
Figure 7 is a partial vertical sectional view taken on line 7—7 in Fig. 4 showing a punch control mechanism.

It will be seen in Fig. 7 that when the rod 62 is in its inoperative position a clearance exists between the same and rod 54 so that there is no interference with either the rotation of support 40 about axis X—X or that of the sleeves 39 about their own axis.

Normally, the two bead mold halves are held pressed against each other by the action of springs 64 (Fig. 4) mounted on the jaws 37. The latter are forced apart, when the mold is to be opened once the finishing step is completed, by the insertion therebetween of a wedge 65 operated by a compressed air cylinder 66 secured to bracket 43 (Figs. 2 and 6).

The pressure necessary to drive the glass upwards within the roughing molds 3 and 4 once the latter are closed is produced by the admission of compressed air into the sleeve 39 through a pipe 67 which is secured to support 40 and whose inlet communicates, at every half of a revolution of said support, with the orifice of a duct 68 provided in a stationary disc 69 mounted on bracket 43 (Fig. 6). Such passage is made fluid-tight by a gunmetal ring 70 received in the orifice of pipe 67 and constantly pressed by a spring 53 against disc 69. The air thus admitted into sleeve 39 flows through grooves provided about the plunger 51 and the foot of punch 52 and enters the cavity originated by the latter in the glass mass present in the roughing mold 3.

An additional duct 68a opens into disc 69 at a point diametrically opposite to 68 and serves similarly to admit pressure air into sleeve 39 when same is positioned above the finishing mold 28 for the purpose of completing the blowing of the cup a.

The periodic rotation of the bead mold support 40 is obtained (Figs. 6 and 8) by means of a rack 71 rigid with a pair of pistons 72 reciprocable in compressed air cylinders 73 secured to bracket 43, which rack meshes with a pinion 74 freely mounted about a disc 75 secured to the hollow trunnion or sleeve 41, said pinion being coupled intermittently with said disc by means of a latch 76 which is alternatively pushed in one direction by the rod 77 of a piston reciprocable in a compressed air cylinder 78 and pulled in the reverse direction by a collar 79 on the rod of another piston reciprocable in a compressed air cylinder 80. Said latch, which is slidably mounted on the pinion 74 and parallel to axis X—X, can be engaged successively into one of a pair of diametrically opposite holes 81, 82 in disc 75. In the position shown in Fig. 6 the latch is engaged in hole 82 in the disc.

Upon said latch then being pulled out of the hole 82 by the collar 79 while the rod of piston 77 is moved in the same direction, air is admitted into the cylinders 73, where the pistons 72 are positioned at the ends of their strokes toward the right, and the latter will drive the rack 71 towards the left; at the end of its stroke (Fig. 8) the rack will have rotated the pinion 74 through one half of a revolution without carrying disc 75 therewith; the latch 76 will thus be positioned in alignment with piston rod 77 and hole 81. Upon air then being admitted into the left sides of cylinders 78 and 80, the latch 76 will be pushed again towards the right and re-set into coupling position, this time however within the hole 81 in disc 75, while the collar 79 will be brought back to the position shown. Thereafter, admission of air to the left of pistons 72 will drive again rack 71 towards the right, whereby the disc 75, together with the support 40 and the whole bead mold system will be carried by the pinion 74 in the direction shown by the arrow $f_1$.

After the completion of such half-turn the control mechanism will be again in its initial position, while the bead molds will have been rotated through 189° about the axis X—X and will have interchanged their positions with respect to the roughing mold 3 and the finishing mold 28. The same operation will take place again after the glass has been finished in mold 28 and stripped.

The glass is taken out by means of tongs 83 (Figs. 1, 2 and 9) carried by arms hinged at 85 on a bracket 86 that can be raised, lowered and swung about a vertical axis; for this purpose, the bracket 86 is secured to the rod 87 of a piston 88 reciprocable in a compressed air cylinder 89 secured to bracket 43; said piston is rigid with a rod 90 projecting upwards and guided by a pair of rollers 91 along slots 92 cut symmetrically in the walls of a sleeve 93 secured on cylinder 89 (Figs. 1 and 3); each slot comprises two straight portions $d$, $e$ with an inclined portion $f$ therebetween, so that the radial displacement of the bracket 86 is altered during its vertical reciprocation whenever the rollers 91 have moved through the inclined portions $f$; at the top of the stroke the centre of the tongs is positioned co-axially with the finishing mold 28, whereas at the bottom of the stroke it is positioned above a landing table 94 supported at an adjustable level by a vertical rod 95 secured on stand 1 in alignment with piston rod 87. The tongs 83 are opened and closed (Fig. 9) by means of a compressed air cylinder 96 secured on bracket 86 and piston of which is connected with the arms 84 by links 97.

Pressure air is distributed to such cylinders as 8, 15, 20, 26, 32, 35, 47, 47', 63, 66, 73, 78, 80, 89, 96 by means of valves 98 located at E (Fig. 2) and controlled by cams 99 provided on a series of discs 100 secured on a shaft 101; an additional shaft 102 carries discs 103 provided with cams 104 to control valves 105 located at F on the stand, some of which control the flow of compressed air towards the discs 69 in the various units for the purpose of blowing the gathers within the roughing molds 3 and the finishing molds 28 while the other valves control the suction in the leg and foot molds 4.

The shafts 101 and 102 are driven by a motor 106 through the medium of a variable ratio transmission gear, for instance such as a roller 107 adapted frictionally to drive a disc 108 and to be displaced radially on said disc together with the motor by the aid of a carriage 109 and an adjusting screw threaded shaft 110.

Arranged at G is the mechanism for controlling the operation of the spouts 21 through the medium of compressed air cylinder 26.

The speeds of the shafts 101 and 102 and consequently the durations of the periods of operation of units A, B, C and D can be modified depending on the requirements, each period corresponding to half a revolution of the bead mold supports 40. The durations of the various operations that take place during each of said periods can also be varied separately by a suitable selection of the cams 99 and 104.

With the machine thus described as to its main elements, its general operation may be summarized as follows:

The parts are illustrated in Figs. 1 and 4 at the moment when, the glass mass once poured into roughing mold 3, mold 4 has been closed and plug 16 lowered; the punch 52 is still in its raised position. It will first be lowered by the action of cylinder 63 upon rod 54, and by the effect of the compressed air admitted into plunger 51 the glass mass thus punched will be blown upwards first through mold 3 and then into mold 4, while its base remains held in the bead mold 36; at the same time a suction is exerted within mold 4 through grooves 11, which provides for the ascension of the glass up to the narrowest portions of said mold.

In some instances, for example, where the section of the stem is comparatively small, the mechanism adapted to revolve the gather within the roughing molds will not be set into action; however, in most instances where this will be possible, said revolution will be produced, by allowing air to flow alternatingly into the right and the left sides of compressed air cylinder 47, in order to avoid seams being left on the gather by the mold joints.

As soon as the roughing of the gather is completed the molds 3 and 4 are opened, plug 16 lifted and support 40 swivelled through half a revolution in the direction shown by the arrow $f_1$. At that moment the finishing mold 28 has already been opened, emptied and lowered to a position slightly below the one illustrated, so that the roughed gather with its already finished foot can be brought to the position shown in Figs. 1 and 4. As soon as the gather is positioned, the finishing mold 28, having completed its travel upwards, will be closed and compressed air will be admitted into sleeve 39 positioned thereabove for the purpose of blowing the gather and of shaping the cup portion $a$ (Fig. 11); in addition, an alternating rotational movement will be imparted to said gather by the action of compressed air cylinder 47.

During the said blowing step, an elongation or an upsetting of the stem $b$ will have been precluded by a table 122 adjustably secured to bracket 31. Thereafter, the finishing mold 28 will be opened again and lowered together with bracket 31 and table 122.

On the other hand, the tongs 83 which previously, when opened, laid a finished glass upon table 94, will be lifted, then swung as a result of the running of the rollers 91 through the portions $e$, $f$ and $d$ of slots 92, so that as soon as the finishing mold 28 is opened and lowered the tongs are in position to close about the neck of the gather just below the bead mold 36, these successive movements of the tongs being controlled by the compressed air cylinders 89 and 96 as described hereinbefore. As soon as the completed glass is thus caught, the bead mold 36 is opened by the action of the wedge 65, Fig. 6, whereafter the tongs are lowered again and swung about the axis of cylinder 89 until the glass foot is positioned a little above table 94 at that moment the tongs are opened and the glass laid upon the table.

A repeated rotation of support 40 in the direction shown by the arrow $f_1$ will take place during such ejection of the blown article, so that the empty bead mold 36 will be brought back to its upper position below the roughing mold 3, and where it will be closed by the action of springs 64. The roughing mold 3, which had remained open during such half of a revolution, will then be closed about the bead mold 36, after which a new glass mass can be poured thereinto through spout 21 and the above-described operation can be repeated in the same manner.

The finished glasses may be removed by hand as soon as they are laid on table 94, or they may be carried away automatically on a conveyor travelling on a level with said table where they may be laid by tongs 83.

This machine is capable of wide variations in the manufacture of articles of a wide range of shapes and sizes as a result of the possibility of altering the relative levels of the various elements, of dispensing with or substituting different molds, or of modifying the durations of the various steps, and if desired to provide for the gathers to revolve within the molds, etc.

For instance, in the manufacture of glasses with a comparatively short stem, the roughing mold 4 can be dispensed with and the punched gather can be transferred into a finishing mold 123 (Fig. 11) designed simultaneously to shape the cup portion $a$ by blowing and the leg $b$ with its foot $c$ both by blowing and by suction, with the aid of grooves 124 similar to grooves 11 in Fig. 4, such production being accomplished with or without a rotation of the gather within the molds.

The above examples will explain how the machine described hereinbefore can be adapted for the simultaneous manufacture of articles of extremely various shapes and sizes to which a character of finish can be imparted that was to be found up to the present only in hand made articles.

Of course, instead of four units capable of simultaneously producing different articles, the machine can be comprised by a greater or lesser number of the same, and the parts comprising each unit can be replaced by other equivalent parts.

What I claim as my invention and desire to secure by Letters Patent is:

1. A method of manufacturing drinking glasses and similar glass articles formed with a cup, a leg and a foot molded in one piece, which consists in pouring molten glass into a roughing mold conforming in its upper portion to the shape of the foot and the leg of the drinking glass, blowing air into the bottom of said roughing mold while sucking air out of the top of the same, whereby the molten glass is compelled to fill said upper portion while a cavity is formed in that portion of the glass which remains in the lower portion of said roughing mold, removing the partially formed glass from the mold, inverting the roughly shaped glass, enclosing the hollow portion of the roughly shaped glass in a finishing mold conforming to the desired cup shape, the foot and leg of the glass remaining exposed to the surrounding air, blowing air into the cavity in the hollow portion enclosed in said finishing mold, rotating the glass about its axis alternatingly in the one and the other direction as air is blown thereinto, and removing the glass thus blown from the mold.

2. A method according to claim 1 in which an alternating rotary motion is imparted to the glass mass about its own axis as it is forced into the upper portion of the roughing mold while said mold is kept stationary.

3. A machine for the automatic manufacture of drinking glasses and like glass articles formed with a cup, a leg and a foot molded in one piece, comprising a roughing mold formed in two halves and arranged with its axis vertical and comprising an upper portion conforming to the shape of the foot and the leg of the drinking glass or the like and a lower portion adapted to receive a gather, a movable plug to close the top of the upper portion of said mold, a bead mold formed in two halves and adapted to be pressed against the lower portion of the roughing mold, means to open and close the two halves of the said roughing mold, means to open and close the two halves of the bead mold, means to move said plug up and down, means to blow air through the bead mold into the gather present in the roughing mold, and means to suck air from the upper portion of said roughing mold to form a rough glass article having a hollow portion, a finishing mold also formed in two halves, means to open and close the two halves of said finishing mold, means for transferring as a whole the said bead mold and the rough glass article while inverting same from the roughing mold into the finishing mold and to leave the leg and the foot of the drinking glass freely exposed outside said finishing mold, means to blow air once more into the hollow portion of the glass, means to impart an alternating rotary motion to the bead mold and the roughly shaped article within the finishing mold, means to take the blown article out of the finishing and bead molds and control means for the automatic actuation of the aforesaid means.

4. A machine for the automatic manufacture of drinking glasses and like glass articles formed with a cup, a stem, and a foot molded in one piece, comprising a roughing mold formed in two halves and arranged with its axis in vertical position and comprising an upper portion conforming to the shape of the foot and the stem of the drinking glass or the like and a lower portion adapted to receive a gather, a movable plug adapted to close the top of the upper portion of said mold, a finishing mold also formed in two halves, means for opening and closing the two halves of the finishing mold, a horizontal shaft having its axis extending at right angles to the plane through the axis of the roughing and the finishing molds, a pair of bead molds each formed in two halves and arranged symmetrically at either side of said latter shaft and extending at right angles thereto, means for opening and closing the two halves of each of said bead molds, means for moving said plug up and down, means for blowing air through the bead mold in registration with the roughing mold and into the gather present in the latter, and means for drawing air from the upper portion of said roughing mold to form a rough glass article having a hollow portion, means for periodically rotating said horizontal shaft through an angle of 180 degrees in order to bring said bead molds alternatively into the lower portion of the roughing mold and to invert and bring same into the upper portion of the finishing mold leaving the stem and foot of the drinking glass freely exposed outside said finishing mold, means for blowing air again into the hollow portion of said glass, means for imparting an alternating rotary motion to the bead mold and the roughly shaped article within the finishing mold, said latter means including pinions on said bead molds, racks guided on said horizontal shaft and engaging said pinions, and means for reciprocating said racks, means for taking the blown article out of the finishing and bead molds, and control means for the automatic actuation of the aforesaid means.

JACQUES TOURRES.

REFERENCES CITED

The following references are of record in the file of this patent:

UNITED STATES PATENTS

| Number | Name | Date |
| --- | --- | --- |
| 186,986 | Burgun | Feb. 6, 1877 |
| 704,055 | Leistner | July 8, 1902 |
| 731,885 | Gegenheimer | June 23, 1903 |
| 1,694,486 | Nixon | Dec. 11, 1928 |
| 1,875,202 | Aftergut | Aug. 30, 1932 |
| 1,878,521 | Ingle | Sept. 20, 1932 |
| 2,075,363 | Smith | Mar. 30, 1937 |
| 2,084,285 | Wadman | June 15, 1937 |
| 2,151,876 | Wadman | Mar. 28, 1939 |
| 2,276,399 | Hrdina | Mar. 17, 1942 |
| 2,328,873 | Young | Sept. 7, 1943 |

FOREIGN PATENTS

| Number | Country | Date |
| --- | --- | --- |
| 286,679 | Germany | Sept. 23, 1913 |
| 479,928 | Germany | July 23, 1926 |
| 541,783 | Germany | Jan. 19, 1932 |
| 554,120 | Great Britain | June 21, 1943 |